United States Patent
Farrell et al.

(10) Patent No.: US 9,889,510 B2
(45) Date of Patent: Feb. 13, 2018

(54) VARIABLE RAKE FATIGUE ENHANCING ORBITAL DRILLING CUTTER

(71) Applicant: The Boeing Company, Chicago, IL (US)

(72) Inventors: Nicholas R. Farrell, Long Beach, CA (US); Gary Lipczynski, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/987,839

(22) Filed: Jan. 5, 2016

(65) Prior Publication Data

US 2017/0189973 A1    Jul. 6, 2017

(51) Int. Cl.
*B23C 5/10* (2006.01)
*B23C 3/02* (2006.01)

(52) U.S. Cl.
CPC .................. *B23C 5/10* (2013.01); *B23C 3/02* (2013.01); *B23C 2210/0414* (2013.01); *B23C 2210/0435* (2013.01); *B23C 2210/0457* (2013.01); *B23C 2210/247* (2013.01); *B23C 2210/285* (2013.01); *B23C 2215/04* (2013.01); *B23C 2220/52* (2013.01); *B23C 2222/04* (2013.01)

(58) Field of Classification Search
CPC ......... B23C 3/02; B23C 5/10; B23C 2220/52; B23Q 17/2233; B23Q 17/2266; B23Q 17/2275; B23B 2210/247
See application file for complete search history.

(56) References Cited

U.S. PATENT DOCUMENTS

| | | | | |
|---|---|---|---|---|
| 3,456,316 | A | * | 7/1969 | Dawson .................... B23C 5/10 407/53 |
| 3,803,981 | A | * | 4/1974 | Allgeyer .............. B23Q 1/0018 408/124 |
| 5,056,963 | A | | 10/1991 | Kameno |

(Continued)

FOREIGN PATENT DOCUMENTS

| | | |
|---|---|---|
| CN | 102489765 A | 6/2012 |
| JP | 06-190622 A * | 7/1994 ............... B23C 5/10 |

(Continued)

OTHER PUBLICATIONS

JP 06-190622 A (Translation) obtained at https://dossier1.j-platpat.inpit.go.jp/tri/all/odse/ODSE_GM101_Top.action (last visited Apr. 27, 2017).*

(Continued)

*Primary Examiner* — Daniel Howell
*Assistant Examiner* — Ryan Rufo
(74) *Attorney, Agent, or Firm* — McDonnell Boehnen Hulbert & Berghoff LLP

(57) ABSTRACT

Within examples, systems and methods for forming a hole through at least one layer of a material are provided. An example cutting tool for forming such a hole may include a body, and a first portion of the body having a first diameter and a first radial rake angle. The cutting tool also includes a second portion of the body adjacent the first portion, the second portion having a second diameter and a second radial rake angle, wherein the second diameter is different than the first diameter, and wherein the second radial rake angle is different than the first radial rake angle.

13 Claims, 9 Drawing Sheets

(56) References Cited

U.S. PATENT DOCUMENTS

| | | | | |
|---|---|---|---|---|
| 5,282,705 | A * | 2/1994 | Shiga | B23B 51/00 408/211 |
| 5,641,252 | A | 6/1997 | Eriksson | |
| 5,930,143 | A * | 7/1999 | Savazzi | B23Q 1/4809 356/639 |
| 6,053,082 | A * | 4/2000 | Rupp | B23B 29/03435 408/181 |
| 6,997,651 | B2 | 2/2006 | Kawai et al. | |
| 7,306,408 | B2 * | 12/2007 | Wells | B23C 5/10 407/53 |
| 7,905,687 | B2 | 3/2011 | Dufour et al. | |
| 2003/0017017 | A1 * | 1/2003 | Linderholm | B23Q 1/4885 409/190 |
| 2003/0190201 | A1 * | 10/2003 | Marusich | B23C 3/00 407/54 |
| 2004/0170480 | A1 * | 9/2004 | Kawai | B23C 5/10 407/53 |
| 2008/0193234 | A1 | 8/2008 | Davancens | |
| 2008/0206003 | A1 * | 8/2008 | Flynn | B23C 5/003 407/54 |
| 2010/0166510 | A1 * | 7/2010 | Inamasu | B23C 5/10 407/11 |
| 2010/0183383 | A1 * | 7/2010 | Volokh | B23C 5/10 407/54 |
| 2010/0183395 | A1 * | 7/2010 | Mejerwall | B23B 35/00 409/191 |

FOREIGN PATENT DOCUMENTS

| | | | | | |
|---|---|---|---|---|---|
| JP | 06-270007 | A | * | 9/1994 | B23C 5/10 |
| JP | 06-335816 | A | * | 12/1994 | B23C 5/10 |
| JP | 2003-275918 | A | * | 9/2003 | B23C 5/10 |
| JP | 2005-111638 | A | * | 4/2005 | B23C 5/10 |
| JP | 2010-105093 | A | * | 5/2010 | B23C 5/10 |

OTHER PUBLICATIONS

Description JP 2005111638 obtained at https://worldwide.espacenet.com/ (last visited Jul. 26, 2017).*
European Search Report for corresponding European application No. 16195775.8, dated Jun. 12, 2017.
WPI/2017 Clarivate Analytics, Abstract only of Chinese patent No. CN102489765, Suzhou Ahno Precision Cutting Tool Tech, Jun. 13, 2012.
Wikipedia, "Linear encoder", https://en.wikipedia.org/wiki/Linear_encoder, retrieved May 26, 2017.
Gardiner, "Orbital Drilling enable "one-up assembly"", Composites World, (2012), http://www.compositeworld.com/articles/orbital-drilling-enables-one-up-assembly, retrieved May 26, 2017.

* cited by examiner

VARIABLE RAKE FATIGUE ENHANCING ORBITAL DRILLING CUTTER

FIELD

Embodiments of the present disclosure relate generally to orbital drilling. More particularly, embodiments of the present disclosure relate to an improved orbital drilling tool to impart residual stresses in the sidewall of the hole to thereby improve fatigue life.

BACKGROUND

Holes may be created in materials using a variety of techniques including, but not limited to, orbital drilling and reaming. Both orbital drilling and reaming have individual advantages when creating holes in multi-layered assemblies such as the fuselage of an aircraft. Reaming, for example, has been shown to induce beneficial stresses in the wall of a hole. These beneficial stresses result in improved fatigue life of the hole. However, the reaming process creates burrs in the area around the drilled hole. The process of removing these burrs requires the removal of the material layers from an assembly stack. This process is time consuming and labor intensive in large structures such as an aircraft fuselage.

In contrast, orbital drilling allows for the creation of holes without the need to remove material layers from an assembly stack. This method of manufacture is commonly known as one-up assembly. Orbital drilled holes, however, typically experience a fatigue knockdown when compared to reamed holes. Such a fatigue knockdown is due to a reaming process inducing beneficial residual stresses in the wall of the hole that improve fatigue life, whereas an orbital drilling process cuts cleanly and leaves the machined surface in a neutral state of stress. Further, conventional drilling processes are more time consuming and labor intensive. As such, methods and systems for orbital drilling that induces residual stresses in the wall of the hole may be desirable.

SUMMARY

An enhanced cutting tool and orbital drilling system and methods of use are disclosed. The present disclosure provides a cutting tool with two cutting diameters. The first cutting diameter features positive rake geometries typical of regular orbital drilling or milling cutters that are designed for clean and efficient removal of the majority of material from the hole. The second set of teeth further down the tool feature negative radial rake angles designed to induce residual stresses in the wall of the hole.

In one example, a cutting tool is provided comprising a body. The cutting tool also comprises a first portion of the body having a first diameter and a first radial rake angle. The cutting tool also comprises a second portion of the body adjacent the first portion, the second portion having a second diameter and a second radial rake angle, wherein the second diameter is different than the first diameter, and wherein the second radial rake angle is different than the first radial rake angle.

In another example, an orbital drilling system is provided comprising a control unit coupled to a power supply, the control unit controlling the location and actuation of an automated drilling machine such that the automated drilling machine moves a motor to a desired location, the motor being configured to move a cutting tool in an orbital pattern. The orbital drilling system also comprises a cutting tool. The cutting tool comprises a body. A first portion of the body has a first diameter and a first radial rake angle. The cutting tool further comprises a second portion of the body adjacent the first portion, the second portion having a second diameter and a second radial rake angle, wherein the second diameter is different than the first diameter, and wherein the second radial rake angle is different than the first radial rake angle In still another example, a method is provided for forming a hole through at least one layer of a material. The method comprises removing a portion of the material from the at least one layer using a first portion of a cutting tool to form a hole having a sidewall, wherein the first portion has a first diameter and a first radial rake angle. The method further comprises removing additional material from the sidewall using a second portion of the cutting tool, wherein the second portion has a second diameter and a second radial rake angle, wherein the second diameter is different than the first diameter, and wherein the second radial rake angle is different than the first radial rake angle.

The features, functions, and advantages that have been discussed can be achieved independently in various embodiments or may be combined in yet other embodiments further details of which can be seen with reference to the following description and drawings.

DETAILED DESCRIPTION

Figure 1:
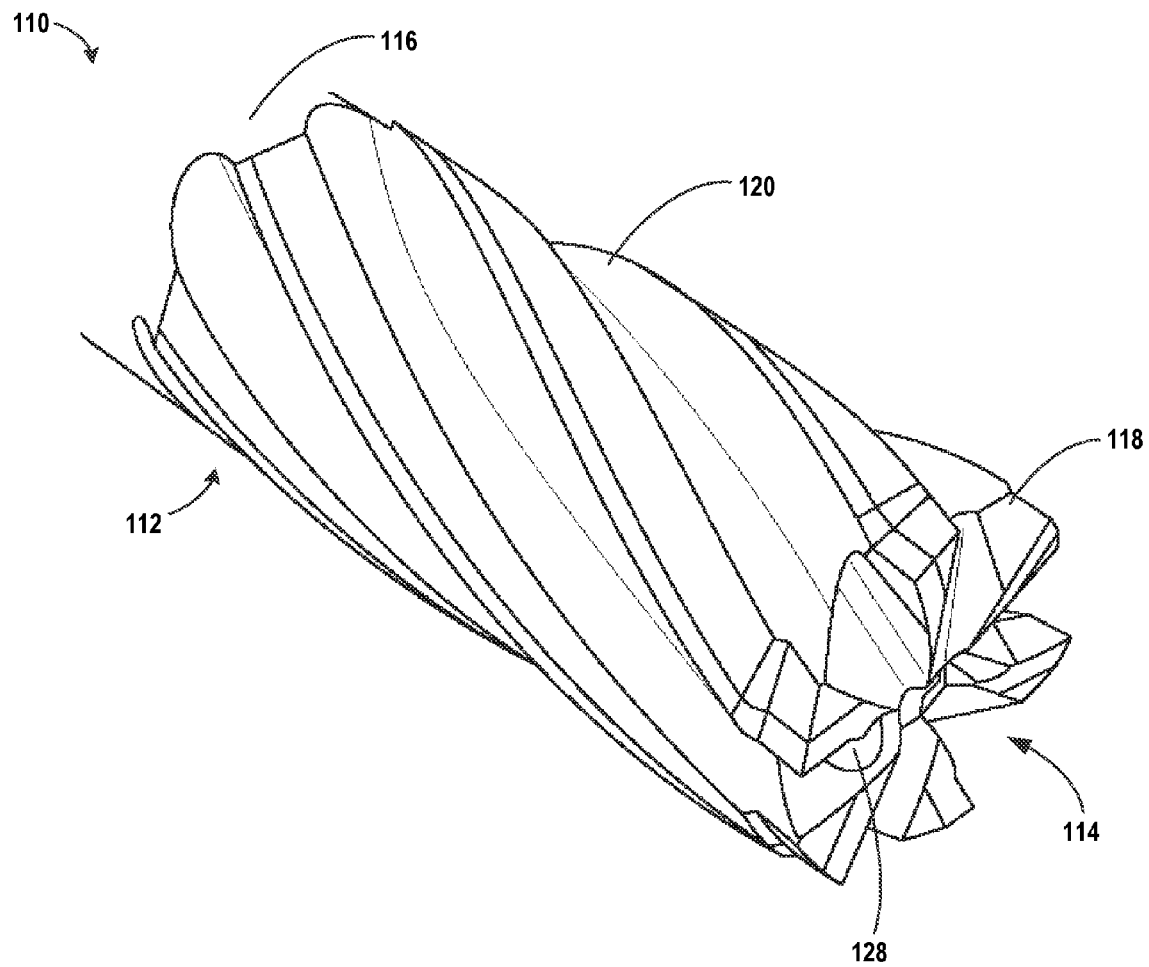
FIG. 1 illustrates an example cutting tool, according to one example embodiment.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, structures, control surfaces, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

There are many different ways to form holes in a workpiece. Two of these ways are orbital drilling and reaming. Orbital drilling is based on rotating a cutting tool around its own axis and simultaneously around an offset center axis. Thus, the cutting tool can move simultaneously in an axial direction to drill or machine a hole and navigate horizontally (like a router tool) to machine an opening or cavity larger than the tool's diameter. By calculating an offset, and moving the spinning tool in a circular motion, a single cutting tool can be used to drill holes of any diameter larger than the tool's diameter. This can substantially reduce cutting tool inventory and tool changeover frequency. Orbital drilling systems make it possible to drill a complex-shaped hole and perform finishing operations with the same diameter tool and setup. Orbital drilling systems also allow manufacturers to create holes in multiple layers of materials without the need to remove material layers from the assembly stack (this process is commonly referred to as one-up assembly. Thus, the need for specific tools for additional tasks is greatly reduced because orbital drilling also can be used for adaptive stack drilling, cutting returns, and countersinking.

However, orbital drilled holes typically experience an inferior fatigue life (e.g., a fatigue knockdown) when compared to reamed holes. Such a fatigue knockdown is due to a reaming process inducing beneficial residual stresses in the wall of the hole that improve fatigue life, whereas an orbital drilling process cuts cleanly and leaves the machined surface in a neutral state of stress. However, such reaming processes create burrs in the machined surface that do not allow for one up assembly. Further, conventional drilling processes are more time consuming and labor intensive. As such, methods and systems for orbital drilling that induces residual stresses in the wall of the hole may be desirable.

Referring now to the figures, FIG. 1 illustrates an example cutting tool, according to one embodiment. In particular, FIG. 1 illustrates a three-dimensional view of the cutting tool 110. The cutting tool 110 includes a body 112 having a leading end 114 including a first portion 118, an attachment end 116 configured to couple the cutting tool 110 to an orbital drilling system, and a second portion 120 positioned between the first portion 118 and the attachment end 116. As shown in FIG. 1, the second portion 120 may extend an entire length from the first portion 118 to the attachment end 116. The attachment end 116 may be substantially smooth so as to securely fit in an orbital drill chuck. The cutting tool 110 may further include one or more openings 128 extending through the cutting tool to allow heat to dissipate or lubrication to reach the cutting surface. The first portion 118 may have a first diameter and a first radial rake angle. The second portion 120 may be adjacent to the first portion 118 and may have a second diameter that is different than the first diameter of the first portion 118. The second portion 120 may further have a second radial rake angle that is different than the first radial rake angle of the first portion 118. In particular, the second diameter of the second portion 120 is larger than the first diameter of the first portion 118.

Figure 2:
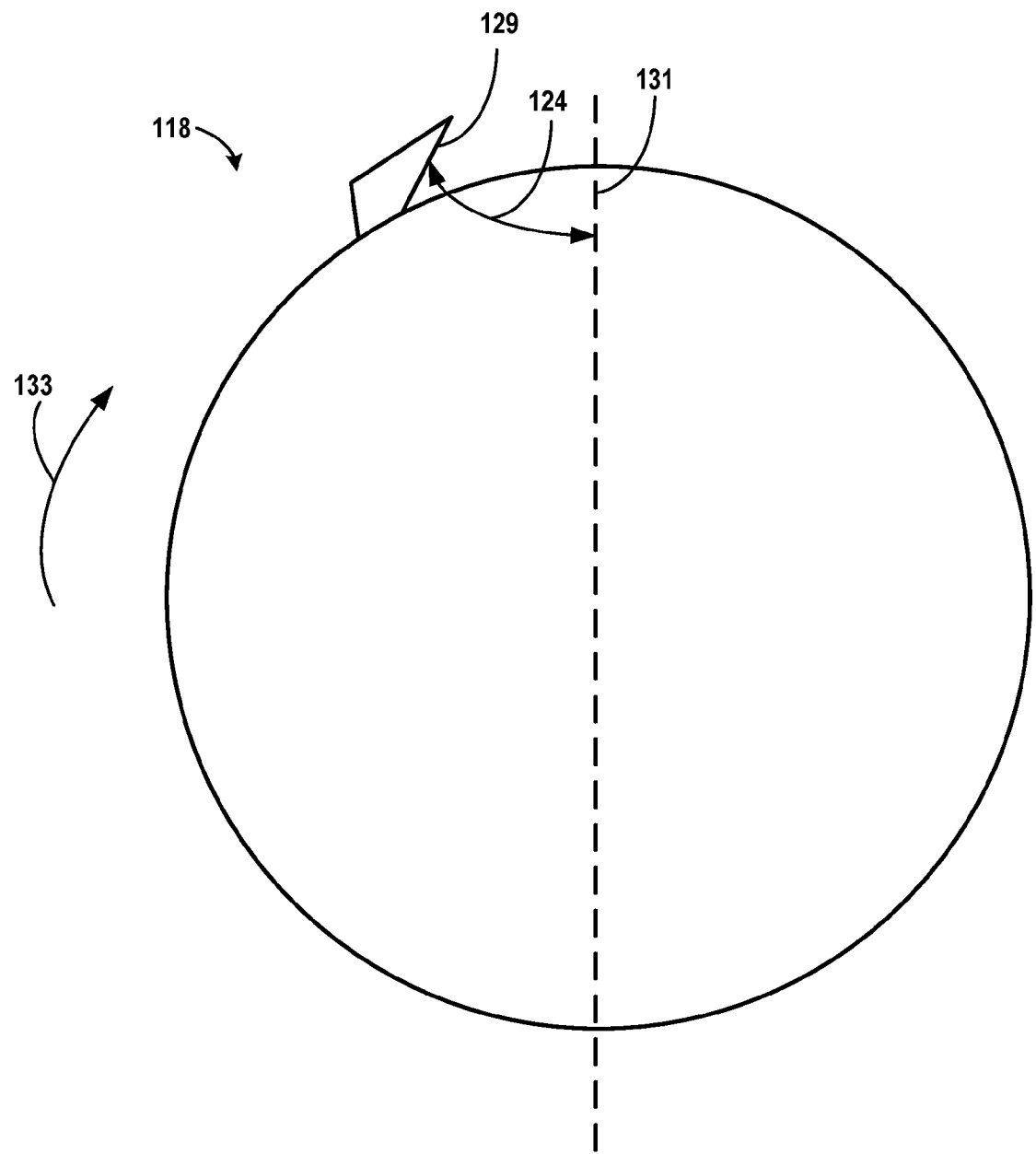
FIG. 2 illustrates a cross section of a first portion of an example cutting tool, according to one example embodiment.

FIG. 2 is an illustration of a single tooth face 129. The tooth face 129 has been isolated and its angles and geometry have been exaggerated for the purposes of explanation and clarity. FIG. 2 does not represent the geometry of the current invention. Rather, FIG. 2 is intended to illustrate a positive radial rake angle that would be seen in a cross section of the first portion 118. As shown in FIG. 2, the first portion 118 may have a first radial rake angle 124, and a direction of rotation 133. The radial rake angle 124 of the cutting tool 110 is the angle between the tooth face 129 and a radial line 131 passing through the cutting edge in a plane perpendicular to the cutting axis. In FIG. 2, the first portion 118 has a positive radial rake angle 124. The positive radial rake angle 124 of the first portion 118 initially removes the majority of the material to form a hole in the workpiece having a sidewall while generating minimal heat.

Figure 3:
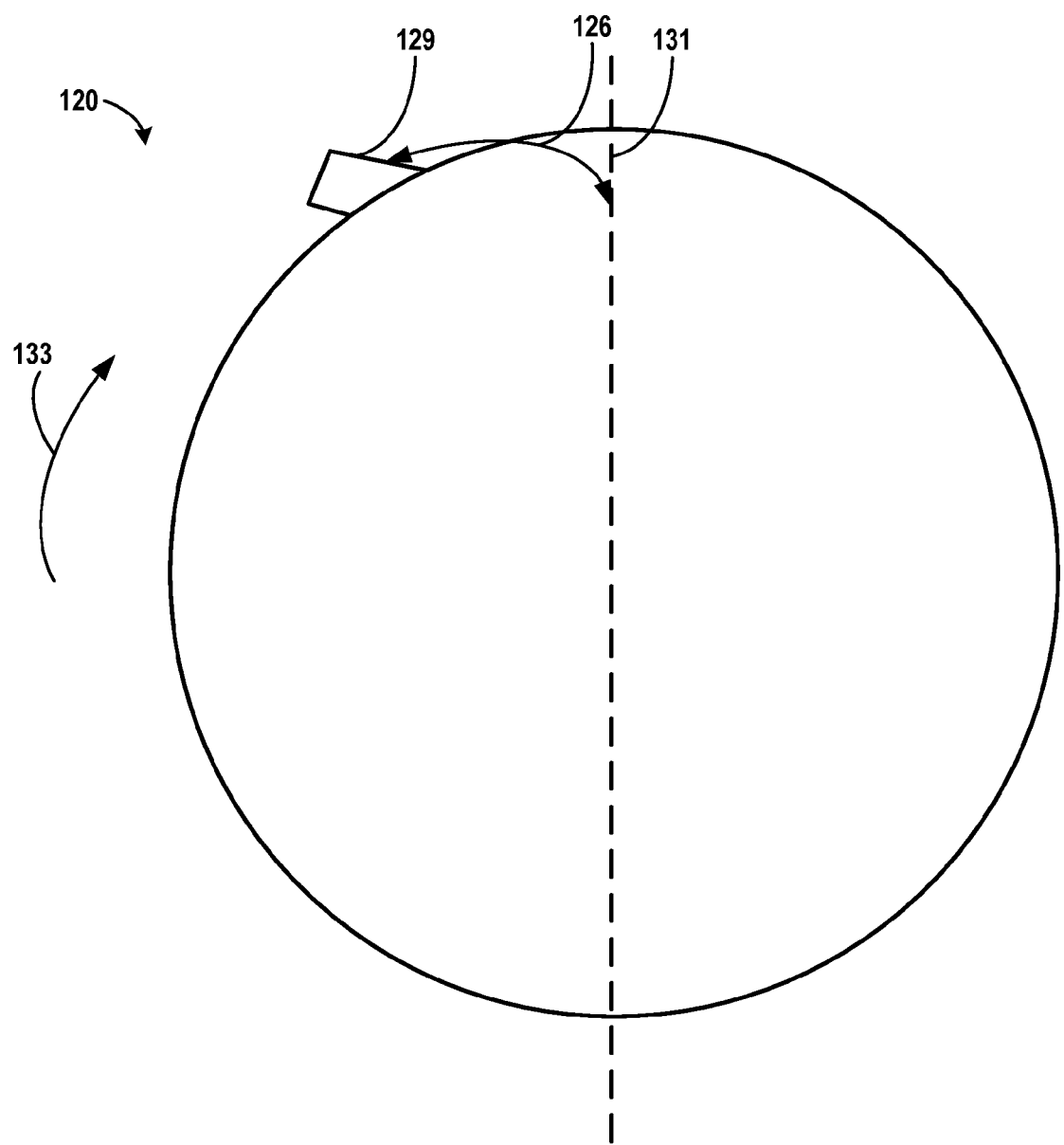
FIG. 3 illustrates a cross section of a second portion of an example cutting tool, according to one example embodiment.

FIG. 3 is an illustration of a single tooth face 129. The tooth face 129 has been isolated and its angles and geometry have been exaggerated for the purposes of explanation and clarity. FIG. 3 does not represent the geometry of the current invention. Rather, FIG. 3 is intended to illustrate a negative radial rake angle that would be seen in a cross section of the second portion 120. As shown in FIG. 3, the second portion 120 has a second radial rake angle 126, and a direction of rotation 133. As previously described, the radial rake angle 126 of the cutting tool 110 is the angle between the tooth face 129 and a radial line 131 passing through the cutting edge in a plane perpendicular to the cutting axis. In FIG. 3, the second portion 120 has a negative radial rake angle 126. The negative radial rake angle 126 of the second portion 120 removes a small amount of additional material from the sidewall of the hole to thereby impart residual stresses in the sidewall. These residual stresses improve the fatigue like of such orbital drilled holes and are particularly beneficial in aluminum structures.

The positive radial rake angle 124 of the first portion 118 and the negative radial rake angle 126 of the second portion 120 may vary. However, a positive radial rake angle 124 of approximately 10 degrees and a negative radial rake angle of approximately negative 10 degrees has been shown to impart beneficial residual stresses while prolonging tool life.

Figure 4:
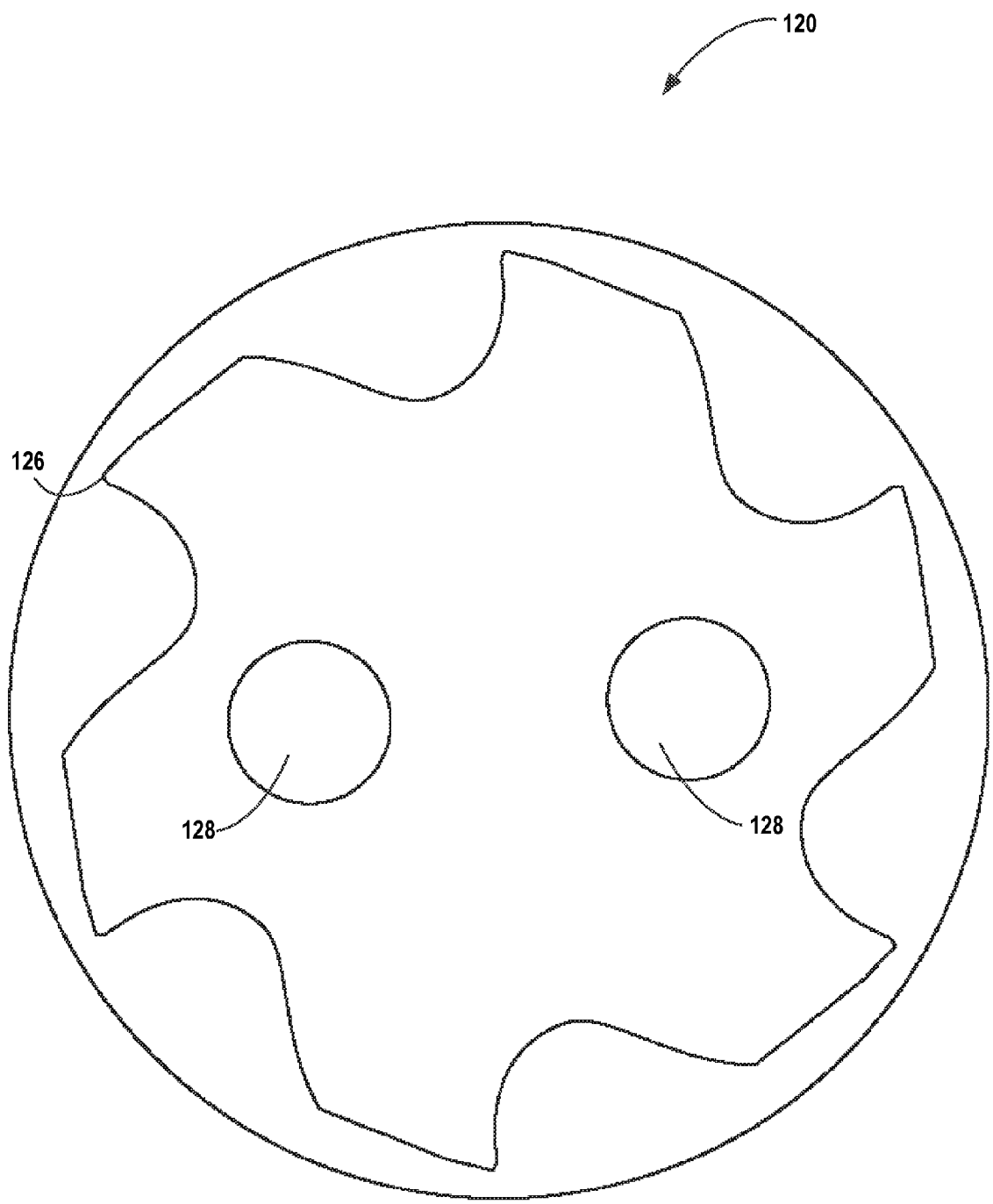
FIG. 4 illustrates another cross section of the second portion of an example cutting tool, according to one example embodiment.

FIG. 4 depicts another cross section of the second portion 120 of the cutting tool 110. As shown in FIG. 4, the cutting tool 110 includes at least one hollow opening (although two are depicted, the tool may function with one or none) 128. Hollow openings 128 may extend partly or entirely through the length of the cutting tool 110. Where hollow openings 128 extend entirely through the length of the cutting tool 110, they may be in fluid communication with a lubricant or water source (not shown) configured to provide lubrication or cooling water to the cutting surface. Alternatively, the hollow openings may be exposed to ambient conditions to allow heat from the cutting surface to dissipate to the air.

Figure 5:
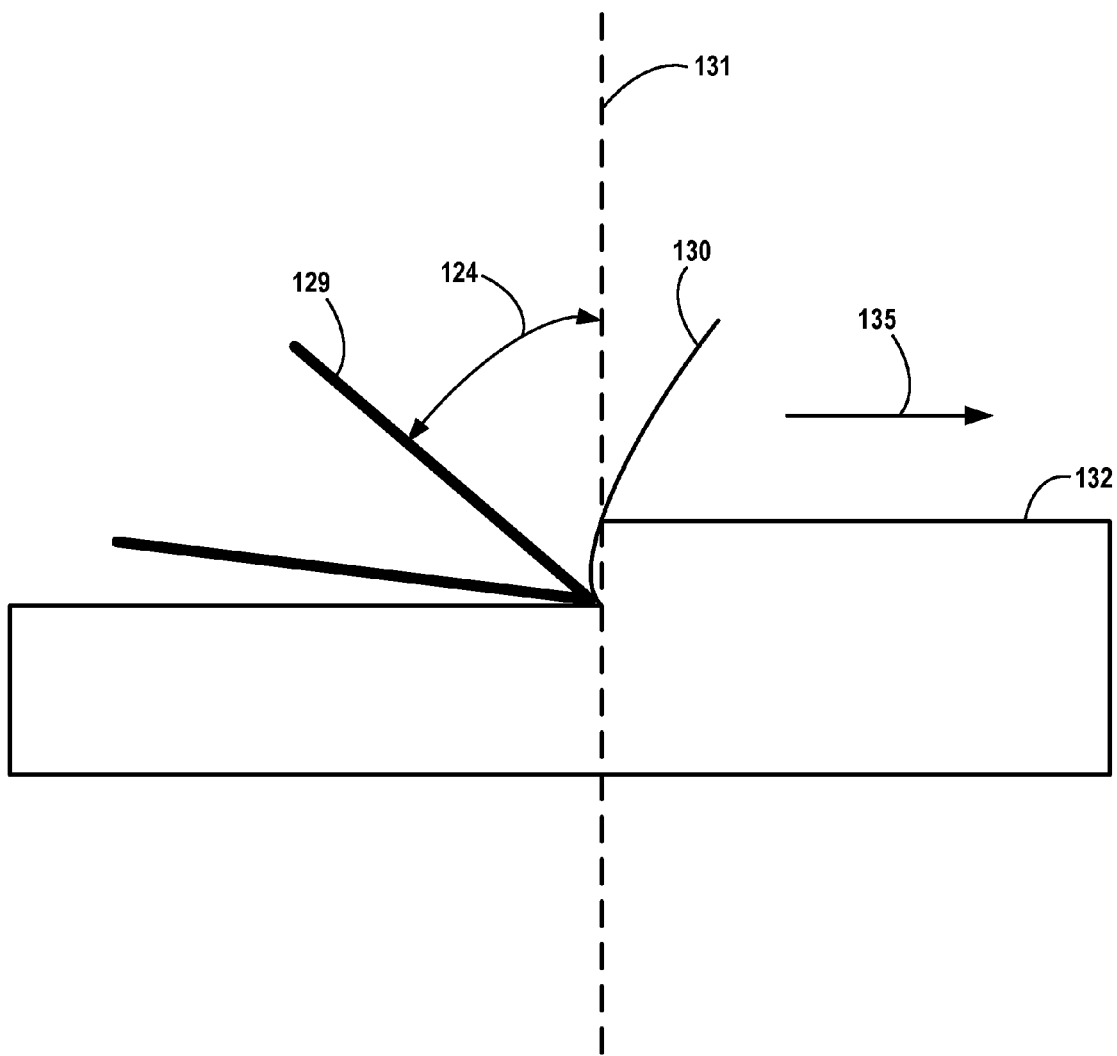
FIG. 5 illustrates a close-up view of the first portion of an example cutting tool in operation, according to one example embodiment.
Figure 6:
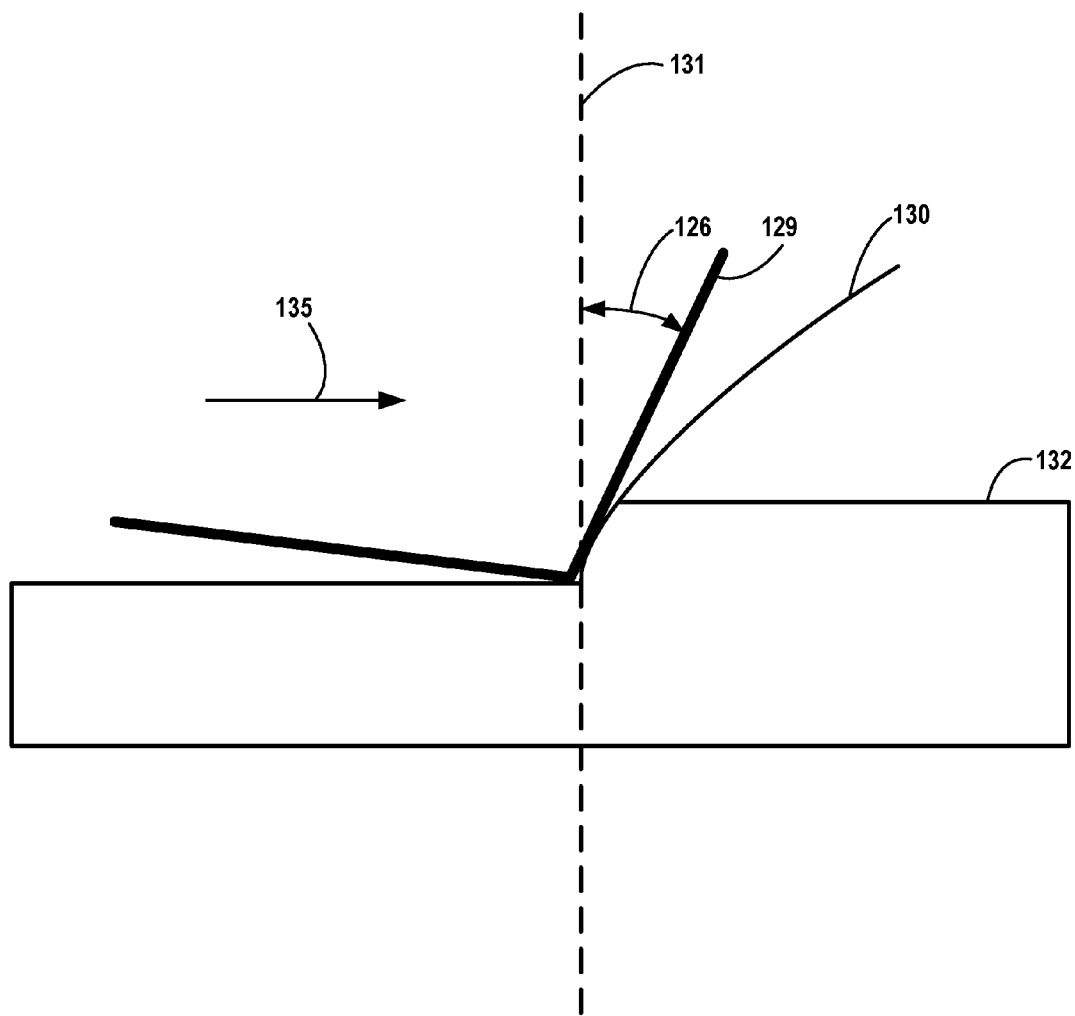
FIG. 6 illustrates a close-up view of the second portion of an example cutting tool in operation, according to one example embodiment.

FIG. 5 is a close-up view of the first portion 118 of the cutting tool 110 in operation. The positive radial rake angle 124 of the first portion 118 is tilted away from the cut direction 135 such that the cut chip 130 is lifted from the workpiece 132. Similarly, FIG. 6 depicts a close-up view of the second portion 120 of the cutting tool 110. The negative radial rake angle 126 of the second portion 120 is tilted towards the cut direction 135 such that the cut chip 130 is forced down into the workpiece 132.

The first portion 118 of the cutting tool 110 may have a length that is substantially smaller than the length of the second portion 120. For example, the ratio of the length of the first portion 118 to the length of the second portion may be 1:5, 1:10, or 1:20, as examples. In one further example, the first portion 118 may have a length that approximately corresponds with a thickness of a workpiece through which the orbital drilling system 100 will drill. For example, if the cutting tool is configured to drill holes in a material that is approximately 0.125 inches thick, the first portion 118 may have a length that is approximately 0.125 inches.

The first portion 118 and the second portion 120 may be made from the same material, such as carbide, or high speed steel as examples. In another example, the first portion 118 may be made from a first material, while the second portion 120 may be made from a second material. Further, although the radial rake angle for the first portion 118 and the second portion 120 are different, other attributes of the cutting tool 110 may be the same in the first portion 118 and the second portion 120. For example, the axial rake angle, the helical angle, and other characteristics of the flutes and cutting edges of the cutting tool 110 may be the same in the first portion 118 and the second portion 120.

Figure 7:
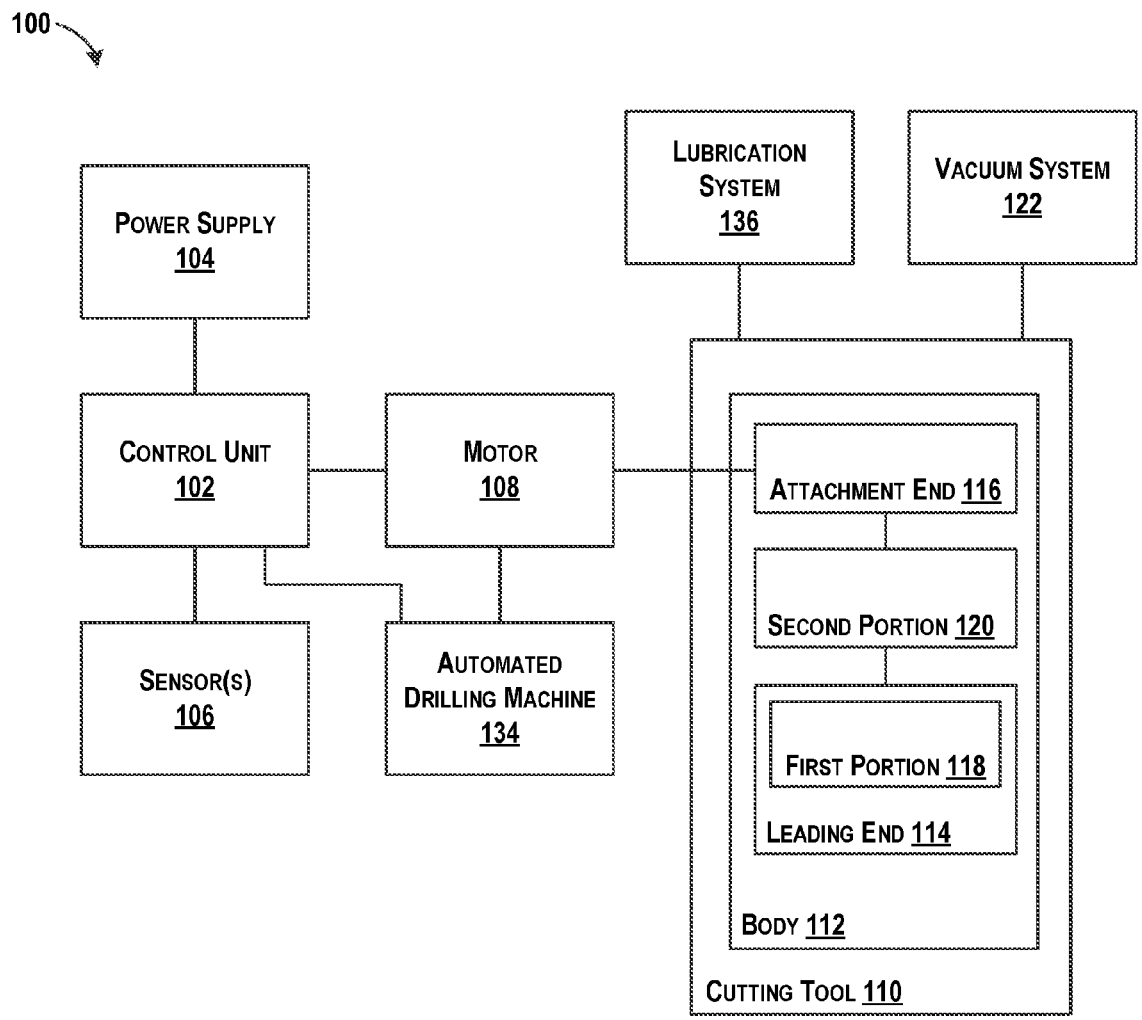
FIG. 7 is a block diagram of an example orbital drilling system, according to one example embodiment.

FIG. 7 is a block diagram of an example orbital drilling system 100, according to one embodiment. The orbital drilling system 100 includes a control unit 102 coupled to a power supply 104 and sensor(s) 106. In one embodiment, the control unit 102 is further coupled to an automated drilling machine 134 which, in turn, is coupled to a motor 108 that is coupled to a cutting tool 110. In another embodiment, the control unit 102 may be independently coupled to both the automated drilling machine 134 and the motor 108. In yet another embodiment, the control unit 102 may be coupled to the motor 108 and the automated drilling machine 134 may be absent. The automated drilling machine 134 may be configured to receive coordinate data from the control unit 102 describing the desired location of the hole to be cut. The automated drilling machine 134 may be further configured to move the cutting tool 110 to the desired hole location. The motor 108 may be configured to move the cutting tool 110 in an orbital pattern to form a hole in a workpiece. The cutting tool 110 may further include a body 112, and the body may include a leading end 114 and an attachment end 116. The attachment end 116 may be configured to couple the motor 108 to the cutting tool 110. In particular, the attachment end 116 may be substantially smooth so as to fit in an orbital drill chuck, for example. The leading end 114 may include a first portion 118 of the body 112. Further, a second portion 120 of the body 112 may be positioned between the first portion 118 and the attachment end 116. In particular, the second portion 120 may extend an entire length of the body 112 from the first portion 118 to the attachment end 116. The orbital drilling system 100 may further include a vacuum system 122 coupled to the cutting tool 110 to remove debris from drilling, which eliminates disassembly and reassembly for cleaning. The orbital drilling system 100 may also include a lubrication system 136 coupled to the cutting tool 110 so as to provide lubrication to the cutting surface.

In one example, the first portion 118 and the second portion 120 may be made from the same material, such as carbide, or high speed steel as examples. In another example, the first portion 118 may be made from a first material, while the second portion 120 may be made from a second material. Further, although the radial rake angle for the first portion 118 and the second portion 120 are different, other attributes of the cutting tool 110 may be the same in the first portion 118 and the second portion 120. For example, the axial rake angle, the helical angle, and other characteristics of the flutes and cutting edges of the cutting tool 110 may be the same in the first portion 118 and the second portion 120.

The control unit 102 may be configured to operate the cutting tool 110, and to provide power from the power supply 104 to the motor 108 to do so. The control unit 102 may also be configured to operate the automated drilling machine 134 by providing power from the power supply 104 and coordinate data from the sensors 106. The control unit 102 may receive outputs from the sensors 106 to determine when to initiate operation of the cutting tool 110. The sensors 106 may include one or more gyroscopes, one or more accelerometers, one or more magnetometers, one or more light sensors, and/or one or more infrared sensors. The sensors 106 may more generally include sensors for detecting a location of a workpiece, and a position of the cutting tool 110 with respect to the workpiece.

In operation, the leading end 114 of the cutting tool 110 first contacts the workpiece. As such, the positive radial rake angle of the first portion 118 initially removes the majority of the material to form a hole in the workpiece while generating minimal heat. As the cutting tool 110 moves axially through the workpiece, the negative radial rake angle of the second portion 120 removes a small layer of material from a sidewall of the hole to thereby impart residual stresses in the sidewall. To control excessive heat buildup in the sidewall due to the stresses induced by the negative radial rake angle, the difference in the first diameter and the second diameter can be altered such that the second portion 120 only removes a very small width of material. Further, by removing the bulk of material with the first portion 118 having a positive radial rake angle, and only a small amount of material with the second portion 120 having a negative radial rake angle, excessive heat is not imparted on the cutting tool 110 and/or workpiece. As discussed above, the additional residual stresses in the sidewall of the hole imparted by the second portion 120 may help improve the fatigue life of such orbital drilled holes, particularly in aluminum workpieces.

Figure 8:
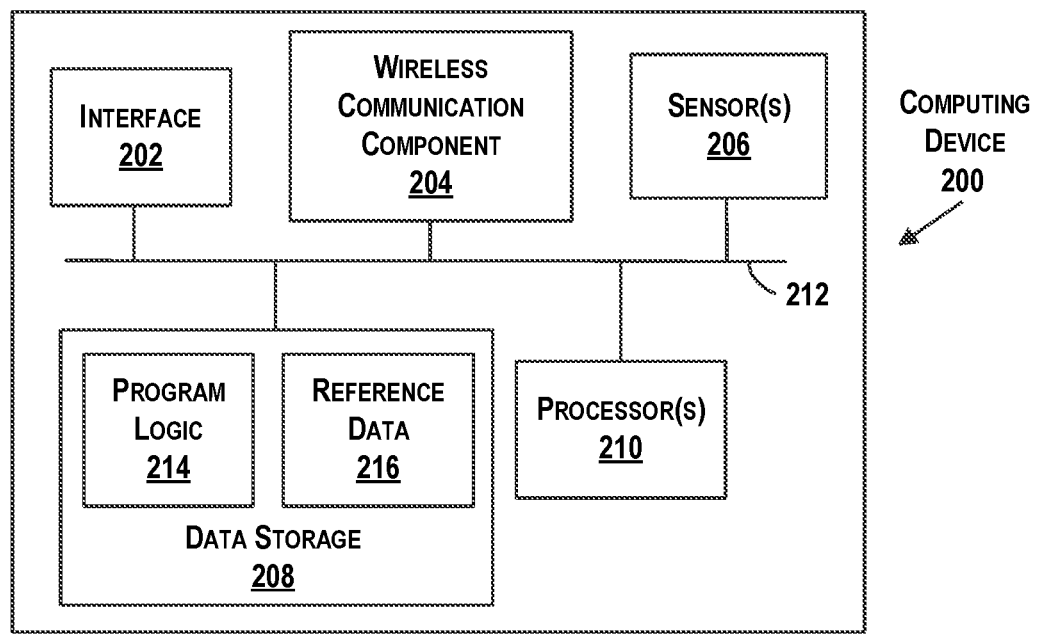
FIG. 8 illustrates a schematic drawing of an example computing device, according to one example embodiment.

FIG. 8 illustrates a schematic drawing of an example computing device 200. The computing device 200 in FIG. 8 may represent the control unit 102 shown in FIG. 7. In some examples, some components illustrated in FIG. 8 may be distributed across multiple computing devices. However, for the sake of example, the components are shown and described as part of one example computing device 200. The computing device 200 may be implemented as, for example but without limitation, a part of an orbital drilling system, or other implementation.

The computing device 200 may include an interface 202, a wireless communication component 204, sensor(s) 206, data storage 208, and a processor 210. Components illustrated in FIG. 2 may be linked together by a communication link 212. The computing device 200 may also include hardware to enable communication within the computing device 200 and between the computing device 200 and another computing device (not shown), such as a server entity. The hardware may include transmitters, receivers, and antennas, for example.

The interface 202 may be configured to allow the computing device 200 to communicate with another computing device (not shown), such as a server or land-based device. Thus, the interface 202 may be configured to receive input data from one or more computing devices, and may also be configured to send output data to the one or more computing devices. In some examples, the interface 202 may also maintain and manage records of data received and sent by the computing device 200. The interface 202 may also include a receiver and transmitter to receive and send data.

The wireless communication component 204 may be a communication interface that is configured to facilitate wireless data communication for the computing device 200 according to one or more wireless communication standards. For example, the wireless communication component 204 may include a Wi-Fi communication component, or a cellular communication component. Other examples are also possible, such as proprietary wireless communication devices.

The sensor(s) 206 may include one or more sensors, or may represent one or more sensors included within the computing device 200. Example sensors may include one or more gyroscopes, one or more accelerometers, one or more magnetometers, one or more light sensors, and/or one or more infrared sensors, for example. The sensors 106 may more generally include sensors for detecting a location of a workpiece, and a position of the cutting tool 110 with respect to the workpiece.

The processor 210 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The data storage 208 may contain program logic 214 and reference data 216. Reference data 210 is configured to store, maintain, and provide data as needed to support the functionality of the system. For example, the reference data 216 may store orbital drilling command signals, or other data. Program logic 214, in turn, may then comprise machine language instructions or the like that are executable by the processing unit 204 to carry out various functions described herein.

In practical embodiments, the data storage 208 may comprise, for example but without limitation, a non-volatile storage device (non-volatile semiconductor memory, hard disk device, optical disk device, and the like), a random access storage device (for example, SRAM, DRAM), or any other form of storage medium known in the art.

The data storage 208 may be coupled to the processor 210 and configured to store, for example but without limitation, a database, and the like. Additionally, the data storage 208 may represent a dynamically updating database containing a table for updating the database, and the like. The data storage 208 may be coupled to the processor 210 such that the processor 210 can read information from and write information to the data storage 208. For example, the processor 210 may access the data storage 208 to access a cutting tool rotation speed, or other data.

As an example, the processor 210 and data storage 208 may reside in respective application specific integrated circuits (ASICs). The data storage 208 may also be integrated into the processor 210. In an embodiment, the data storage 208 may comprise a cache memory for storing temporary variables or other intermediate information during execution of instructions to be executed by the processor 210.

Figure 9:
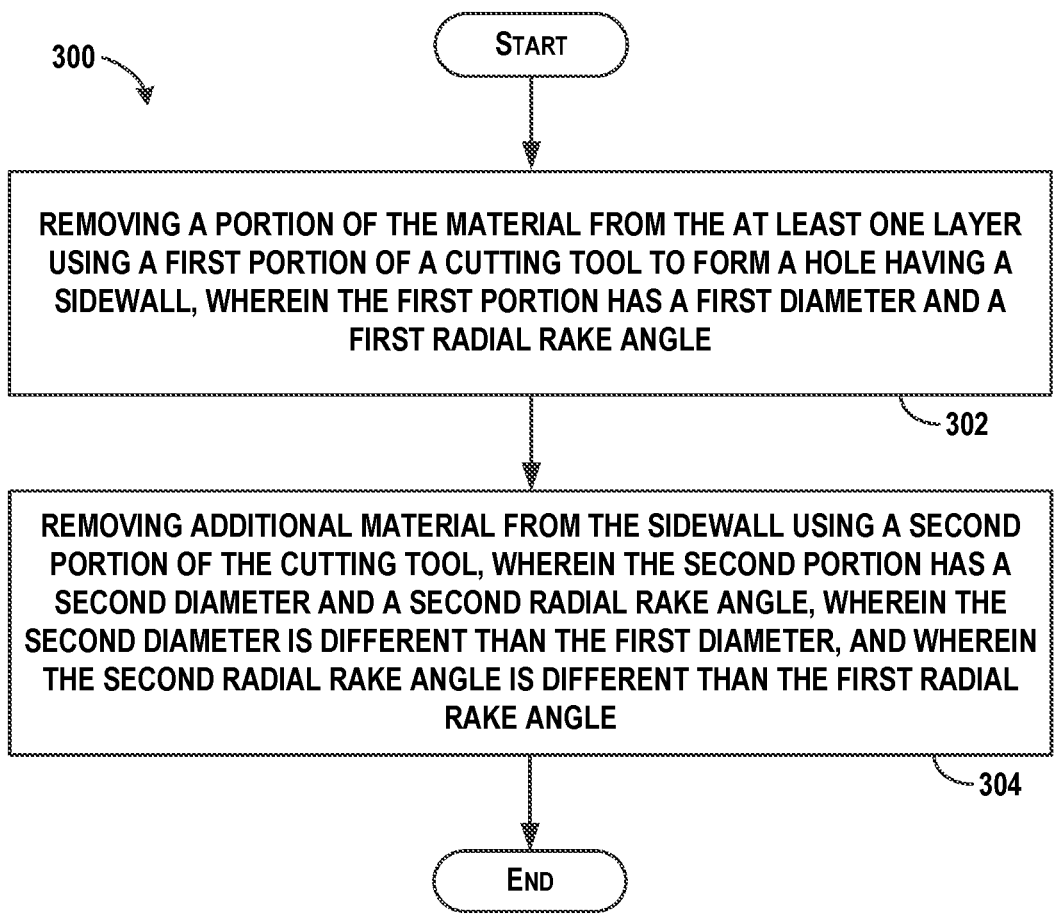
FIG. 9 illustrates a flowchart of an example method for forming a hole through at least one layer of a material, according to one example embodiment.

FIG. 9 shows a flowchart of an example method 300 for forming a hole through at least one layer of a material, according to one embodiment. Method 300 shown in FIG. 9 presents an embodiment of a method that, for example, could be used with the orbital drilling system shown in FIG. 7, for example, and may be performed by a computing device (or components of a computing device, such as those shown in FIG. 8), or may be performed by an operator. Thus, example devices or systems may be used or configured to perform logical functions presented in FIG. 9. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 300 may include one or more operations, functions, or actions as illustrated by one or more of blocks 302-304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 9 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes removing a portion of the material from the at least one layer using a first portion of a cutting tool to form a hole having a sidewall, wherein the first portion has a first diameter and a first radial rake angle. At block 304, the method 300 includes removing additional material from the sidewall using a second portion of the cutting tool, wherein the second portion has a second diameter and a second radial rake angle, wherein the second diameter is different than the first diameter, and wherein the second radial rake angle is different than the first radial rake angle.

As discussed above, the second diameter may be larger than the first diameter. Further, the first radial rake angle may be a positive radial rake angle, and the second radial rake angle may be a negative radial rake angle. As such, the positive radial rake angle of the first portion initially removes the majority of the material to form a hole in the workpiece having a sidewall while generating minimal heat. As the cutting tool moves axially through the workpiece, the negative radial rake angle of the second portion removes the additional material from the sidewall of the hole to thereby impart residual stresses in the sidewall. The additional residual stresses in the sidewall of the hole may help improve the fatigue life of such orbital drilled holes.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A cutting tool comprising:
   a body including a leading end and an attachment end opposite the leading end;
   a first portion of the body having a first diameter and a first radial rake angle, wherein the first portion is included in the leading end, and wherein the first radial rake angle is a positive radial rake angle; and
   a second portion of the body positioned between the first portion and the attachment end, the second portion having a second diameter and a second radial rake angle, wherein the second diameter is greater than the first diameter, wherein the second radial rake angle is a negative radial rake angle, wherein the first radial rake angle is about 10 degrees, and wherein the second radial rake angle is about negative 10 degrees.

2. The cutting tool of claim 1, wherein the second radial rake angle imparts a residual stress on a sidewall of a hole formed by the cutting tool.

3. The cutting tool of claim 1, wherein the attachment end is configured to couple the cutting tool to an orbital drilling system.

4. The cutting tool of claim 1, wherein the body includes at least one hollow opening through the length of the body.

5. A method for forming a hole through at least one layer of a material, the method comprising:
   removing a portion of the material from the at least one layer using the first portion of the cutting tool of claim 1 to form a hole having a sidewall; and
   removing additional material from the sidewall using the second portion of the cutting tool.

6. The method of claim 5, wherein the second radial rake imparts a residual stress on a sidewall of a hole formed by the cutting tool.

7. An orbital drilling system comprising:
   a control unit coupled to a power supply;
   the control unit controlling the location and actuation of an automated drilling machine such that the automated drilling machine moves a motor to a desired location;
   the motor being configured to move a cutting tool in an orbital pattern;
   the cutting tool including:
      a body including a leading end and an attachment end opposite the leading end;
      a first portion of the body having a first diameter and a first radial rake angle, wherein the first portion is included in the leading end, wherein the first radial rake angle is a positive radial rake angle; and
      a second portion of the body positioned between the first portion and the attachment end, the second portion having a second diameter and a second radial rake angle, wherein the second diameter is greater than the first diameter, wherein the second radial rake angle is a negative radial rake angle, wherein the first radial rake angle is about 10 degrees, and wherein the second radial rake angle is about negative 10 degrees.

8. The orbital drilling system of claim 7, further comprising:
   a plurality of sensors configured to detect position of the cutting tool with respect to the workpiece.

9. The orbital drilling system of claim 7, further comprising:
   a vacuum system coupled to the cutting tool to remove debris from drilling.

10. The orbital drilling system of claim 7, further comprising:
    a lubrication system coupled to the cutting tool to provide lubrication to the cutting surface.

11. The orbital drilling system of claim 7, wherein the second radial rake imparts a residual stress on a sidewall of a hole formed by the cutting tool.

12. The orbital drilling system of claim 9, wherein the attachment end is configured to couple the cutting tool to the motor.

13. The orbital drilling system of claim 7, wherein the body includes at least one hollow opening through the length of the body.

* * * * *